(12) United States Patent
Colbeth et al.

(10) Patent No.: US 9,762,828 B2
(45) Date of Patent: Sep. 12, 2017

(54) LOW-POWER IMAGER WITH AUTOSENSING FUNCTION

(71) Applicant: VARIAN MEDICAL SYSTEMS, INC., Palo Alto, CA (US)

(72) Inventors: Richard Colbeth, Los Altos, CA (US); Richard Weisfield, Los Altos, CA (US); Ivan Mollov, Mountain View, CA (US); Cesar Proano, Palo Alto, CA (US); Pieter Roos, Sandy, UT (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 0 days.

(21) Appl. No.: 14/781,314

(22) PCT Filed: Jul. 21, 2015

(86) PCT No.: PCT/US2015/041427
§ 371 (c)(1),
(2) Date: Sep. 30, 2015

(87) PCT Pub. No.: WO2016/014602
PCT Pub. Date: Jan. 28, 2016

(65) Prior Publication Data
US 2016/0227140 A1    Aug. 4, 2016

Related U.S. Application Data

(60) Provisional application No. 62/027,218, filed on Jul. 21, 2014.

(51) Int. Cl.
*H04N 5/32* (2006.01)
*H04N 5/369* (2011.01)
(Continued)

(52) U.S. Cl.
CPC ............. *H04N 5/3698* (2013.01); *G01T 1/00* (2013.01); *H04N 5/32* (2013.01); *H04N 5/3765* (2013.01); *H04N 5/37457* (2013.01)

(58) Field of Classification Search
CPC ...... H04N 5/3698; H04N 5/32; H04N 5/3765; G01T 1/00; H05N 5/37457
See application file for complete search history.

(56) References Cited

U.S. PATENT DOCUMENTS 4,335,307 A * 6/1982 DeVries .................. H05G 1/44
378/97
6,797,960 B1 * 9/2004 Spartiotis ............... G01N 23/04
250/370.01
(Continued)

FOREIGN PATENT DOCUMENTS

EP           1486822 A      12/2004
JP      2002-077730 A       3/2002
(Continued)

OTHER PUBLICATIONS

International Search Report and Written Opinion of the International Searching Authority, International application No. PCT/US2015/041427, Oct. 23, 2015.

*Primary Examiner* — Christine Sung
(74) *Attorney, Agent, or Firm* — Su IP Consulting

(57) ABSTRACT

An imager includes a flat panel configured to collect charges when the imager operates in a full-power charge integration mode. The imager switches to a low-power standby mode immediately after each image acquisition in the full-power charge integration mode. Bias current flowing through the flat panel is monitored in the standby mode. The imager switches to the full-power charge integration mode when detecting a change in the bias current indicating onset of an X-ray exposure.

12 Claims, 3 Drawing Sheets

(51) Int. Cl.
*G01T 1/00* (2006.01)
*H04N 5/3745* (2011.01)
*H04N 5/376* (2011.01)

(56) References Cited

U.S. PATENT DOCUMENTS

| | | |
|---|---|---|
| 7,211,802 B1 | 5/2007 | Dhurjaty et al. |
| 7,211,803 B1 | 5/2007 | Dhurjaty et al. |
| 2004/0065836 A1* | 4/2004 | Schick .................. A61B 6/145 250/370.01 |
| 2004/0252613 A1 | 12/2004 | Iwakiri |
| 2009/0166547 A1 | 7/2009 | Endo et al. |
| 2010/0034353 A1 | 2/2010 | Kravis et al. |
| 2010/0108898 A1 | 5/2010 | Zhang et al. |
| 2012/0018640 A1 | 1/2012 | Shimizukawa et al. |
| 2014/0001368 A1 | 1/2014 | Huang et al. |
| 2016/0366755 A1* | 12/2016 | Han ......................... A61B 6/00 |
| 2017/0048475 A1* | 2/2017 | Sakuragi ............ H04N 5/37457 |

FOREIGN PATENT DOCUMENTS

| | | |
|---|---|---|
| JP | 2005-003756 A | 1/2005 |
| JP | 2007-110630 A | 4/2007 |
| JP | 2007-166240 A | 6/2007 |
| JP | 2010-147934 A | 7/2010 |
| JP | 2010-259688 A | 11/2010 |
| JP | 2011-216723 A | 10/2011 |
| JP | 2012-189485 A | 10/2012 |
| JP | 2014-502915 A | 2/2014 |
| KR | 10-2009-0095298 A | 9/2009 |
| KR | 10-2009-0102185 A | 9/2009 |
| WO | 2013057941 A1 | 4/2013 |

\* cited by examiner

LOW-POWER IMAGER WITH AUTOSENSING FUNCTION

CROSS-REFERENCE TO RELATED APPLICATIONS

The present application is a U.S. National Stage filing under 35 U.S.C. §371 of International Application PCT/US2015/041427, filed Jul. 21, 2015, which claims the benefit of U.S. Provisional Application 62/027,218 filed Jul. 21, 2014. The International Application and the U.S. Provisional Application are incorporated by reference herein in their entirety.

BACKGROUND

Unless otherwise indicated herein, the approaches described in this section are not prior art to the claims in this application and are not admitted to be prior art by inclusion in this section.

Conventional imagers run continuously in order to be available to acquire an image at all times. This requires the panel to consume relative high amount of power. A wireless detector of an imager that operates in a full-power charge integration mode poses a severe constraint on battery life. If a wired panel of the imager is run in an idle mode, it can generally be armed to acquire an image in conjunction with arming the X-ray generator. On the other hand, a wireless panel is not typically in direct communication with the X-Ray generator. Therefore, an idle imager typically has no direct way of knowing when the X-rays may arrive to turn on the panel to acquire an image.

One prior art method of auto-sensing involves acquiring images under the command of a PC host and downstream software used to sort out which images contain actual X-ray image information. Signals developed on the panel itself are used as a means to trigger image acquisition. One prior art approach is to maintain the thin film transistor (TFT) switches in the pixel array at a turned-off condition and sense the bias current when the X-rays turn on. This has at least the following problems: the bias current is only a small fraction of the total photocurrent (<1%) when the TFT switches are shut off, this being the current which charges the parasitic capacitances of the photodiodes to the gate lines and the data lines. This is typically less than 1% of the photocurrent which charges the pixel floating nodes themselves. It is simulated that the bias current flowing during X-ray exposure when the TFT switches are turned off is about 10-1000 nA under typical X-ray conditions, which will be rather difficult to detect above the dark-current background and panel noise. A second issue is that if the TFT switches are held off for long periods of time in the absence of X-rays, the pixels will integrate sensor dark currents and eventually saturate the array in a few minutes. This means that the pixels need to be continuously refreshed every few seconds, and this refresh action could potentially interfere with the unknown arrival of an X-ray pulse.

SUMMARY

In at least some embodiments of the present disclosure, an imager with an auto-sensing function includes a flat panel, a bias supply circuitry, a current detection circuitry, and a gate driver. The flat panel, which includes a plurality of pixels each having a photodiode and a pixel switch, is configured to collect charges during an X-ray exposure when the imager operates in a charge integration mode. The bias supply circuitry is configured to supply a bias voltage to the flat panel. The current detection circuitry is configured to monitor a first bias current flowing through the flat panel under the bias voltage and detect a change in the first bias current caused by an onset of the X-ray exposure. The gate driver circuitry is configured to supply a first voltage to a control end of each pixel switch to fully turn on each pixel switch so as to couple the plurality of pixels to a virtual ground when the imager operates in an idle mode. The gate driver circuitry is also configured to supply a second voltage to the control end of each pixel switch to turn off each pixel switch so as to isolate the plurality of pixels from the virtual ground when the imager operates in the charge integration mode. The gate driver circuitry is configured to supply a third voltage to the control end of each pixel switch to weakly turn on each pixel switch when the imager operates in a standby mode, wherein the third voltage is smaller than the first voltage and larger than a threshold voltage of each pixel switch.

In at least some embodiments of the present disclosure, a method of operating an imager having a flat panel that has a plurality of pixels each having a photodiode and a pixel switch includes configuring the imager to operate in a charge integration mode, switching the imager to a standby mode immediately after acquiring a first image in the charge integration mode, monitoring a first bias current flowing through the flat panel in the standby mode, switching the imager to the charge integration mode in response to detecting a change in the first bias current indicating an onset of an X-ray exposure, supplying a first voltage to a control end of each pixel switch to turn off each pixel switch so as to isolate the plurality of pixels from a virtual ground during the charge integration mode, and supplying a second voltage to the control end of each pixel switch to weakly turn on each pixel switch during the standby mode, wherein the second voltage is smaller than the first voltage and larger than a threshold voltage of each pixel switch.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The technical details set forth in the following description enable a person skilled in the art to implement one or more embodiments of the present disclosure.

One embodiment of the present disclosure is aimed at providing a viable, low-power mode to run a wireless, battery-powered, flat panel imager, so that it can preserve battery life while waiting for an X-ray pulse to arrive, auto-sense the X-rays, and then "wake up" to acquire a high quality image. One key component of one embodiment of the present disclosure is a method to sense the current flowing from the analog bias voltage applied globally to the photodiodes on a flat panel, while maintaining the flat panel in a low-power state. High image quality is maintained by recording an offset image immediately after the X-ray image, taken under the same "wake-up" sequence as the associated X-ray image.

Figure 1:
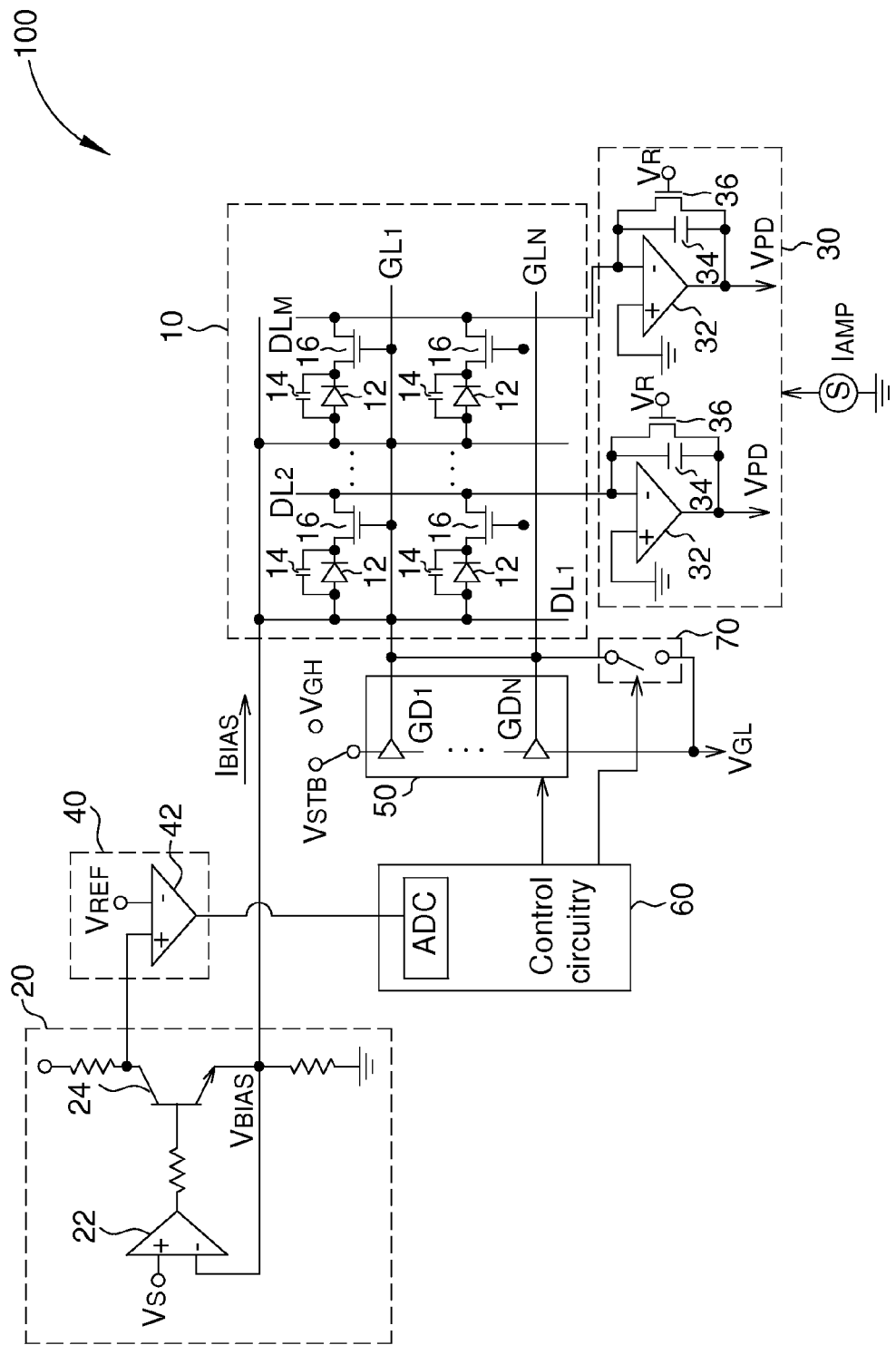
FIG. 1 is a functional schematic of an imager with an auto-sensing function, in accordance with at least some embodiments of the present disclosure.
Figure 2:
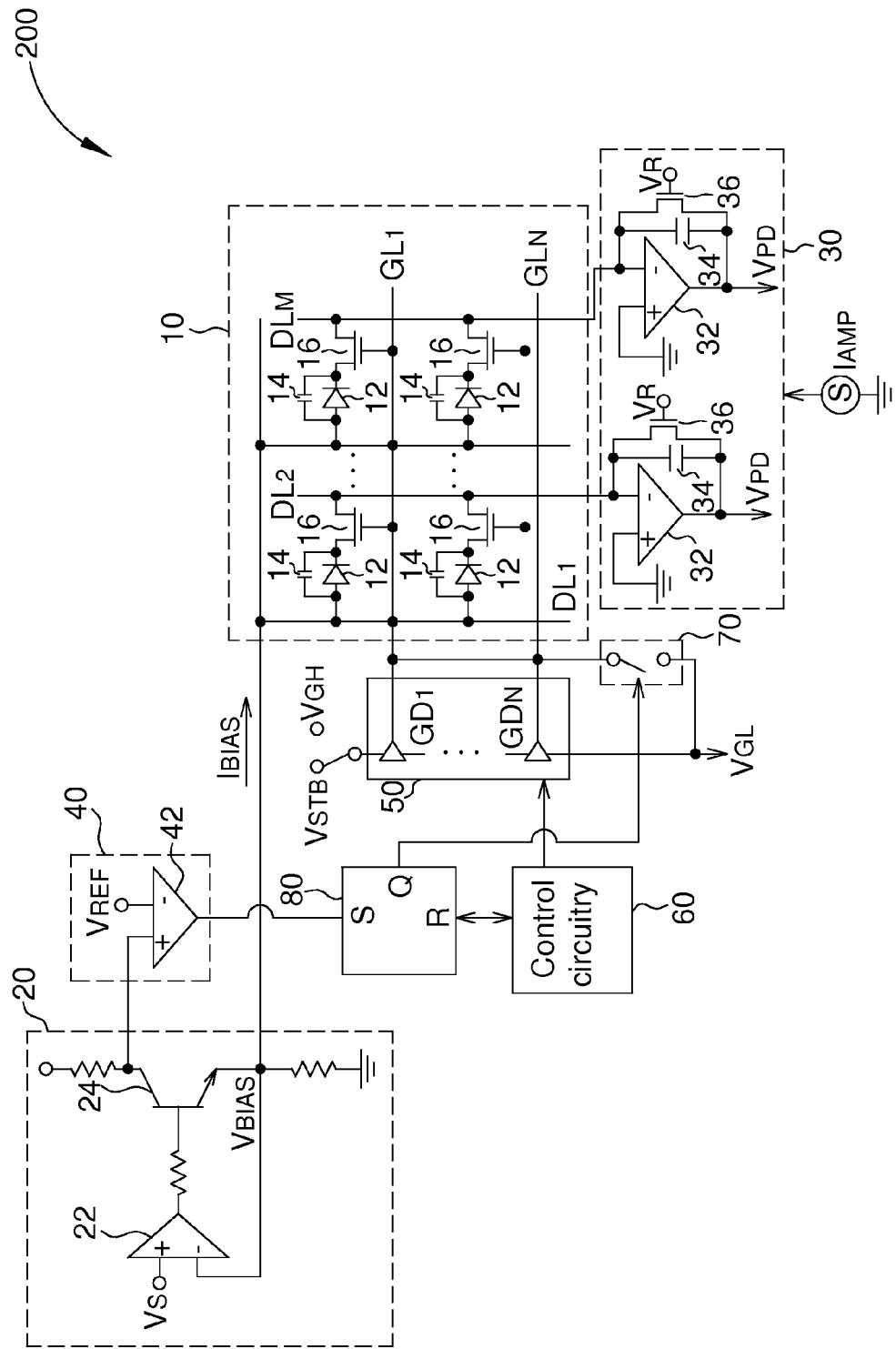
FIG. 2 is a functional schematic of an imager with an auto-sensing function, in accordance with at least some embodiments of the present disclosure.

FIG. 1 is a functional schematic of an imager 100 with an auto-sensing function, in accordance with at least some embodiments of the present disclosure. FIG. 2 is a functional schematic of an imager 200 also with an auto-sensing function, in accordance with at least some embodiments of the present disclosure. Each of the imagers 100 and 200 includes at least a flat panel 10, a bias supply circuitry 20, a charge amplifier circuitry 30, a current detection circuitry 40, a gate driver circuitry 50, a digital control circuitry 60, and a boost circuitry 70. The imager 200 further includes a latch circuitry 80.

The flat panel 10 includes a plurality of data lines $DL_1$-$DL_M$, a plurality of gate lines $GL_1$-$GL_N$ (M and N are positive integers), and a pixel array formed on a substrate made of, for example, amorphous or crystalline silicon or metal insulated semiconductor material. Each pixel in the pixel array may include a photodiode 12 sensitive to X-rays, a capacitor 14 for collecting charges from the photodiode 12 during X-ray exposures, and a pixel switch 16 (such as a TFT) for resetting and selecting the photodiode 12. Although the photodiodes 12 are depicted as PIN diodes in FIG. 1 and FIG. 2, it should be noted that various types of the pixel array, such as NIP photodiodes with a positive Array Bias, may be adopted in the flat panel 10.

The bias supply circuitry 20 is configured to supply a bias voltage $V_{BIAS}$ to the photodiodes of the flat panel 10. $I_{BIAS}$ represents the corresponding bias current flowing through the flat panel 10. In one embodiment, the bias supply circuitry 20 may be implemented using an operational amplifier 22 and a transistor 24. The first end of the transistor 24 is coupled to the current detection circuitry 40. A selectable setup voltage $V_s$ may be applied to the positive input terminal of the operational amplifier 22 to establish a fixed bias potential between the second end of the transistor 24 and the control end of the transistor 24, thereby supplying the bias voltage $V_{BIAS}$ to the pixel array of the flat panel 10. It should be noted that the described implementation of the bias supply circuitry 20 merely corresponds to one embodiment of the present disclosure.

The charge amplifier circuitry 30 is driven by bias current $I_{AMP}$ and configured to output pixel photodiode signals $V_{PD}$ after each X-ray exposure. In one embodiment, the charge amplifier circuitry 30 may be implemented using at least a charge amplifier 32, a capacitor 34, and a switch 36. The negative-positive input terminal of the charge amplifier 32 serves as a source of virtual ground potential for the pixel array of the flat panel 10. A reset voltage $V_R$ may be applied to the switch 36 to discharge the capacitor 34 after each readout of photodiode signals from the flat panel 10. It should be noted that the described implementation of the charge amplifier circuitry 30 merely corresponds to one embodiment of the present disclosure.

The current detection circuitry 40 is configured to monitor the bias current $I_{BIAS}$ flowing through the flat panel 10, thereby indicating the presence of X-ray exposure on the pixels. In one embodiment, the current detection circuitry 40 may include a comparator 42 having its positive input terminal coupled to the first end of the transistor 24 in the bias supply circuitry 20 and its negative input terminal coupled to a reference voltage $V_{REF}$. When a significant increase in the bias current $I_{BIAS}$ results in a drop in the voltage at the first end of the transistor 24, the positive input terminal of the comparator 42 falls below the reference voltage level $V_{REF}$. The comparator 42 is triggered to change its output state to indicate the presence of X-ray exposure. It should be noted that the described implementation of the current detection circuitry 40 merely corresponds to one embodiment of the present disclosure.

The gate driver circuitry 50 may include a plurality of gate drivers $GD_1$-$GD_N$ each coupled to a corresponding gate line. The gate driver circuitry 50 may apply an ON voltage $V_{GH}$ to the gate lines $GL_1$-$GL_N$ for turning on all pixel switches 16 (short-circuited) or apply an OFF voltage $V_{GL}$ (typically −8V) to the gate lines $GL_1$-$GL_N$ for turning off all pixel switches 16 (open-circuited). Also, the gate driver circuitry 50 may apply a voltage $V_{STB}$ to the gate lines $GL_1$-$GL_N$ for placing on all pixel switches 16 in a weakly turned-on state, wherein $V_{STB}$ is smaller than $V_{GH}$ and larger than the threshold voltage $V_{TH}$ of the pixel switches 16. In an embodiment, the voltage $V_{STB}$ is held just slightly above the threshold voltage $V_{TH}$, typically at 0-5V. However, the value of the voltage $V_{STB}$ may vary depending on the type of the pixel switches 16 adopted in the flat panel 10.

The control circuitry 60 is coupled to the current detection circuitry 40 and configured to provide timing signals to the gate driver circuitry 50 in order to selectively turn on and turn off the pixel switches 16 in the pixel array during operation of the imager 100. The imagers 100 and 200 are configured to operate in a full-power charge integration mode, a low-power standby mode, and a power-down idle mode. General description of the operation of the imagers 100 and 200 is explained hereafter.

While the flat panel 10 is in communication with the user that X-ray images are in process, the imager 100 or 200 is configured to always switch to the low-power standby mode immediately after image acquisition in the full-power charge integration mode. Upon detecting onset of X-ray exposure in the low-power standby mode, the imager 100 or 200 is configured to perform a wake-up process for switching to the full-power charge integration mode. Once the user indicates that the X-ray session is complete, the imager 100 is configured to enter the power-down idle mode.

During the power-down idle mode when there is no X-ray exposure, the gate driver circuitry 50 applies the ON voltage $V_{GH}$ to the gate lines $GL_1$-$GL_N$ for turning on all pixel switches 16 (short-circuited). This effectively connects the photodiodes 12 to a virtual ground connection through the input terminals of the charge amplifiers 32 in the charge amplifier circuitry 30. As a consequence, the bias supply voltage $V_{BIAS}$ from the bias supply circuitry 20 holds the photodiodes 12 in a reverse bias condition, the reverse bias voltage being established at a desired level by the setup voltage $V_s$ applied to the positive input terminal of the operational amplifier 22. Cumulative leakage current through the photodiodes 12 causes a very low current to flow through the transistor 24, resulting in a positive voltage output being applied to the positive input terminal of the comparator 42 in the current detection circuitry 40, thereby providing a low output state (logic 0) on its output terminal.

The control circuitry 60 interprets this low output state as the absence of X-ray and continues to hold all pixel switches 16 in the turned-on state.

During the full-power charge integration mode with the presence of X-ray exposure, the photodiodes 12 in the flat panel 10 are driven into conduction. The charge amplifier circuitry 30 is driven by the bias current $I_{AMP}$ at a nominal value. The bias supply voltage $V_{BIAS}$ of the bias supply circuitry 20 is kept at a constant value (typically at −5V relative to the data lines $DL_1$-$DL_M$) to maintain stability of the photodiodes 12 in the pixel array. The digital control circuitry 60 is turned on to provide timing signals to the gate driver circuitry 50. The gate driver circuitry 50 is configured to keep the gate lines at the OFF voltage $V_{GL}$ to shut down the pixel switches 16 in the pixel array, thereby disconnecting the photodiodes 12 from the charge amplifier circuitry 30 so as to allow charge collection in the pixels.

Immediately after image acquisition in the full-power charge integration mode, the imager 100 or 200 is configured to always switch to the low-power standby mode. During the low-power standby mode, the bias current $I_{AMP}$ supplied to the charge amplifier circuitry 30 is turned off or reduced. The digital control circuitry 60 is turned off. The bias supply voltage $V_{BIAS}$ of the bias supply circuitry 20 is kept at a constant value (typically at −5V relative to the data lines $DL_1$-$DL_M$) as during the full-power charge integration mode to maintain stability of the photodiodes 12 in the pixel array. The gate driver circuitry 50 is configured to hold the control ends of the pixel switches 16 at the voltage $V_{STB}$ to maintain the pixel switches 16 in the weakly turned-on state. The data lines $DL_1$-$DL_M$ are clamped to the virtual ground by means of the charge amplifier circuitry 30. During the low-power standby mode when the pixel switches 16 of the pixel array operate at the voltage $V_{STB}$ just above the threshold voltage $V_{TH}$, the switch characteristics remain basically unchanged as when operating in the full-power charge integration mode and do not cause the threshold voltage $V_{TH}$ to shift significantly. This is thus a highly reliable condition for the flat panel 10 to sit in the low-power standby mode.

The current detection circuitry 40 is configured to monitor the bias current $I_{BIAS}$ flowing through the flat panel 10 during the low-power standby mode, thereby indicating the presence of X-ray exposure on the pixels. As soon as the X-ray generator turns on, the photodiodes 12 in the flat panel 10 are driven into conduction. The cumulative effect of this current in all photodiodes 12 causes a significant increase in the bias current $I_{BIAS}$ which results in a drop in the voltage at the second end of the transistor 24. When this voltage drop falls below the reference voltage $V_{REF}$ on the current detection circuitry 40, the comparator 42 in the current detection circuitry 40 is triggered, thereby changing the output state to a high output state (logic 1). The wake-up process is activated, during which the digital control circuitry 60 starts up and the charge amplifier circuitry 30 powers up to full power (the bias current $I_{AMP}$ is turned on or increased to its nominal value).

In the imager 100, the current detection circuitry 40 is configured to send a corresponding signal to an analog-to-digital converter ADC of the digital control circuitry 60. In the imager 200, the current detection circuitry 40 is configured to send a corresponding signal to the latch circuitry 80. The digital control circuitry 60 of the imager 100 or the latch circuitry 80 of the imager 200 may then trigger the boost circuitry 70, which rapidly connects the gate lines $GL_1$-$GL_N$ to their normally OFF voltage $V_{GL}$ (typically −8V) for disconnecting the photodiodes 12 from the virtual ground so as to allow charge collection in the pixels.

In the present disclosure, the signal used to energize the boost circuitry 70 can come from either the digital control circuitry 60 (imager 100) or the latch circuitry 80 (imager 200). The advantage of using the ADC in the digital control circuitry 60 is the ability to more flexibly set a threshold and monitor false trigger events. At least one advantage of the latch circuitry 80 is that the rest of the digital control circuitry 60 can be turned off during the low-power standby mode to further save power. However, the method of activating the boost circuitry 70 upon detection of X-ray exposure in the low-power standby mode does not limit the scope of the present disclosure.

Normally, the OFF voltage $V_{GL}$ is heavily filtered in order to reduce panel noise, so that connecting the gate lines to this filtered OFF voltage $V_{GL}$ will have a long transient time (minisecond scale). In the present disclosure, the boost circuitry 70 may bypass this filtered OFF voltage $V_{GL}$ in order to allow fast switching from the low-power standby mode to the full-power charge integration mode, and can be disabled once the gate lines have stabilized. In an embodiment, the boost circuitry 70 may include a low-impedance power Metal-Oxide-Semiconductor Field-Effect Transistor (MOSFET) with a turn-on resistance less than 100 Ohms which enables large overall gate line capacitance to be discharged to $V_{GL}$ in less than 10 u second (allowing high currents to rapidly discharge all the gate lines). The charge amplifier circuitry 30 may further includes protection diodes for discharging a short current spike on signals read out from each data line. Although the transient time from the low-power standby mode to the full-power charge integration mode is short, it may cause loss in the X-ray signal integration (less than 20 u second). However, this loss is less than 0.01% of the shortest X-ray pulses expected in radiographic imaging, and may readily be compensated for in subsequent digital image processing which normally involves interpolating based on data of adjacent rows.

After switching to the full-power charge integration mode, the pixel array of the flat panel 10 may continue to integrate charge for a preset period of time (longer than the actual X-ray exposure period), after which the pixel array is read out and an X-ray image is acquired. Once the X-ray image is acquired, the imager 100 returns to the low-power standby mode. An offset image may then be acquired under exactly the same wake-up timing and acquisition sequence, so that any fixed patterns associated with dynamic changes in the array offset voltages can be compensated for. The offset image may be used to account for any slowly drifting change in the offset levels which needs to be immediately captured after taking an X-ray image, using the same wake-up process from the low-power standby mode as the X-ray image. If this variation is negligible or can be predicted from the offset image taken during normal readout, then the offset image may also be taken in the full-power charge integration mode immediately after acquiring the X-ray image.

In some embodiments, the wireless communication channel between the flat panel 10 and the X-ray generator may also be turned off during the low-power standby mode in order to reduce more power. The wireless communication channel may be re-established during the time that the digital control circuitry 60 starts up. Once communication is established, the resulting X-ray and offset images stored in panel memory are then transmitted to the PC host and the flat panel 10 is then reset to its initial idle condition In some embodiments, the charge amplifier circuitry 30 may be completely turned off during the low-power standby mode, and the data lines can be clamped at the virtual ground. Turning off the charge amplifier circuitry 30 during the low-power standby mode can further reduce power consumption and thus extend battery life.

In some embodiments, the bias current $I_{AMP}$ supplied to the charge amplifier circuitry 30 during the low-power standby mode may be reduced by 1/10 to 1/4 of that supplied during the full-power charge integration mode, but its inputs are maintained at the virtual ground. The ASIC power may also be reduced by the same factor. Reducing the current/power supplied to the charge amplifier circuitry 30 during the low-power standby mode allows the charge amplifier circuitry 30 to operate in a well understood manner and ramp up to full power essentially instantaneously.

It is understood that when the bias voltage changes across a photodiode, slowly changing displacement/deep trapping currents occur. These trapping currents take several seconds to stabilize and thus prevent stable operation of the flat panel. Therefore, in the present disclosure, the output of the bias supply circuitry 20 used during the low-power standby mode may be the same as that used during the full-power charge integration mode to maintain stability of the photodiodes 12 in the pixel array at all time. Also, the data lines $DL_1$-$DL_M$ are clamped to the virtual ground by means of the charge amplifier circuitry 30 during the low-power standby mode and the full-power charge integration mode to provide stable operation of the flat panel 10. The imager according to the present disclosure is advantageous in the ability to rapidly switch pixel array from the weakly-on state during the low-power standby mode to the turned-off state during the full-power charge integrating mode in less than 10 u second while retaining more than 99.9% of the image and to allow sufficient time for power to be restored to the charge amplifier circuitry 30 and the digital control circuitry 60 before reading out the image. The present disclosure can greatly save on battery life, allowing for a potentially smaller battery and lighter panel.

Figure 3:
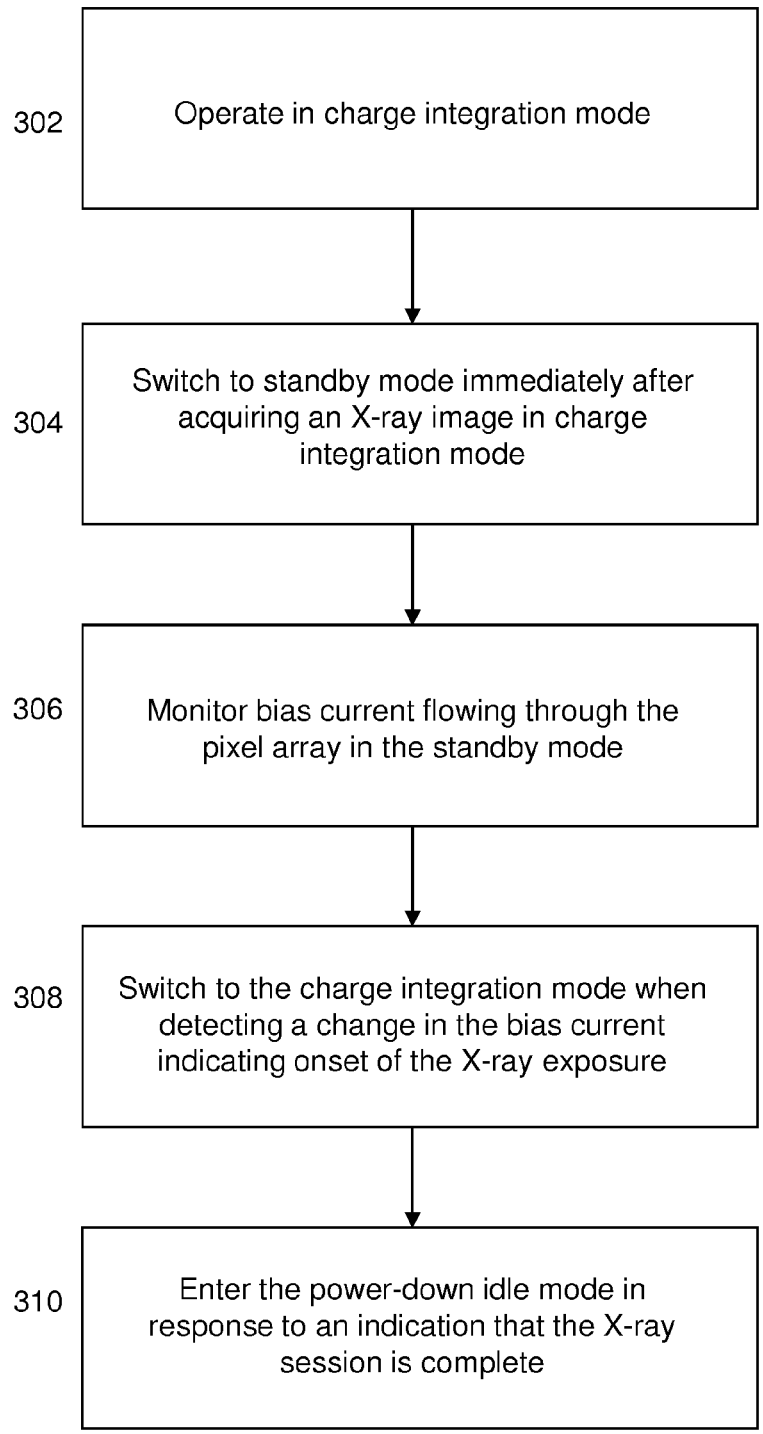
FIG. 3 is a flowchart of an illustrative embodiment of a method for operating an imager in accordance with at least some embodiments of the present disclosure.

FIG. 3 is a flowchart of an illustrative embodiment of a method 300 for operating an imager in accordance with at least some embodiments of the present disclosure. Method 300 may include one or more operations, functions or actions as illustrated by one or more of blocks 302, 304, 306, 308, and/or 310. The various blocks may be combined into fewer blocks, divided into additional blocks, and/or eliminated based upon the desired implementation.

Processing for method 300 may begin at block 302, "operate in charge integration mode." Block 302 may be followed by block 304, "switch to the standby mode immediately after acquiring an X-ray image in charge integration mode." Block 304 may be followed by block 306, "monitor bias current flowing through the pixel array in the standby mode." Block 306 may be followed by block 308, "switch to the charge integration mode when detecting a change in the bias current indicating onset of the X-ray exposure." Block 308 may be followed by block 310, "enter the power-down idle mode in response to an indication that the X-ray session is complete."

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. An imager with an auto-sensing function, comprising:
    a flat panel configured to collect charges during an X-ray exposure when the imager operates in a charge integration mode, the flat panel comprising a plurality of pixels each having a photodiode and a pixel switch;
    a bias supply circuitry configured to supply a bias voltage to the flat panel;
    a current detection circuitry configured to monitor a first bias current flowing through the flat panel under the bias voltage and detect a change in the first bias current caused by an onset of the X-ray exposure;
    a gate driver circuitry configured to:
        supply a first voltage to a control end of each pixel switch to fully turn on each pixel switch so as to couple the plurality of pixels to a virtual ground when the imager operates in an idle mode;
        supply a second voltage to the control end of each pixel switch to turn off each pixel switch so as to isolate the plurality of pixels from the virtual ground when the imager operates in the charge integration mode;
        supply a third voltage to the control end of each pixel switch to weakly turn on each pixel switch when the imager operates in a standby mode, wherein the third voltage is smaller than the first voltage and larger than a threshold voltage of each pixel switch.
2. The imager of claim 1, further comprising:
    a charge amplifier circuitry driven by a second bias current and configured to output pixel photodiode signals acquired during the X-ray exposure, wherein:
        the second bias current is set to a first value of when the imager operates in the standby mode;
        the second bias current is set to a second value of when the imager operates in the charge integration mode; and
        the first value is smaller than the second value.
3. The imager of claim 1, further comprising:
    a low-impedance boost circuitry configured to rapidly connect the control end of each pixel switch to the second voltage immediately after the imager switches from the standby mode to the charge integration mode.
4. The imager of claim 3, further comprising:
    a control circuitry configured to provide timing signals to the gate driver circuitry in order to selectively turn on or turn off each pixel switch; and
    a latch circuitry coupled to the current detection circuitry and configured to activate the low-impedance boost circuitry when the current detection circuitry detects the change in the first bias current.
5. The imager of claim 3, further comprising:
    a control circuitry coupled to the current detection circuitry and configured to:
        provide timing signals to the gate driver circuitry in order to selectively turn on and turn off each pixel switch; and
        activate the low-impedance boost circuitry when the current detection circuitry detects the change in the first bias current.
6. A method of operating an imager having a flat panel, the flat panel comprising a plurality of pixels each having a photodiode and a pixel switch, the method comprising:
    configuring the imager to operate in a charge integration mode;
    switching the imager to a standby mode immediately after acquiring a first image in the charge integration mode;
    monitoring a first bias current flowing through the flat panel in the standby mode;

switching the imager to the charge integration mode in response to detecting a change in the first bias current indicating an onset of an X-ray exposure;

supplying a first voltage to a control end of each pixel switch to turn off each pixel switch so as to isolate the plurality of pixels from a virtual ground during the charge integration mode; and supplying a second voltage to the control end of each pixel switch to weakly turn on each pixel switch during the standby mode, wherein the second voltage is smaller than the first voltage and larger than a threshold voltage of each pixel switch.

7. The method of claim 6, further comprising:

driving a charge amplifier circuitry of the imager with a second bias current to output pixel photodiode signals acquired during the X-ray exposure; and setting the second bias current to a first value when the imager operates in the standby mode or setting the second bias current to a second value when the imager operates in the charge integration mode, wherein the first value is smaller than the second value.

8. The method of claim 6, further comprising:

activating a low-impedance boost circuitry of the imager when detecting the change in the first bias current so as to rapidly connect the control end of each pixel switch to the first voltage.

9. The method of claim 6, further comprising:

turning off a wireless communication channel between the flat panel and an X-ray generator during the standby mode.

10. The method of claim 6, further comprising:

acquiring a second image in the charge integration mode immediately after acquiring the first image; and compensating offset voltages of the plurality of pixels based on the first image and the second image.

11. The method of claim 6, further comprising:

acquiring a second image in the standby mode after acquiring the first image in the charge integration mode; and compensating offset voltages of the plurality of pixels based on the first image and the second image.

12. The method of claim 6, further comprising:

keeping the flat panel under a same bias condition during the charge integration mode and the standby mode.

* * * * *